Patented Jan. 2, 1934

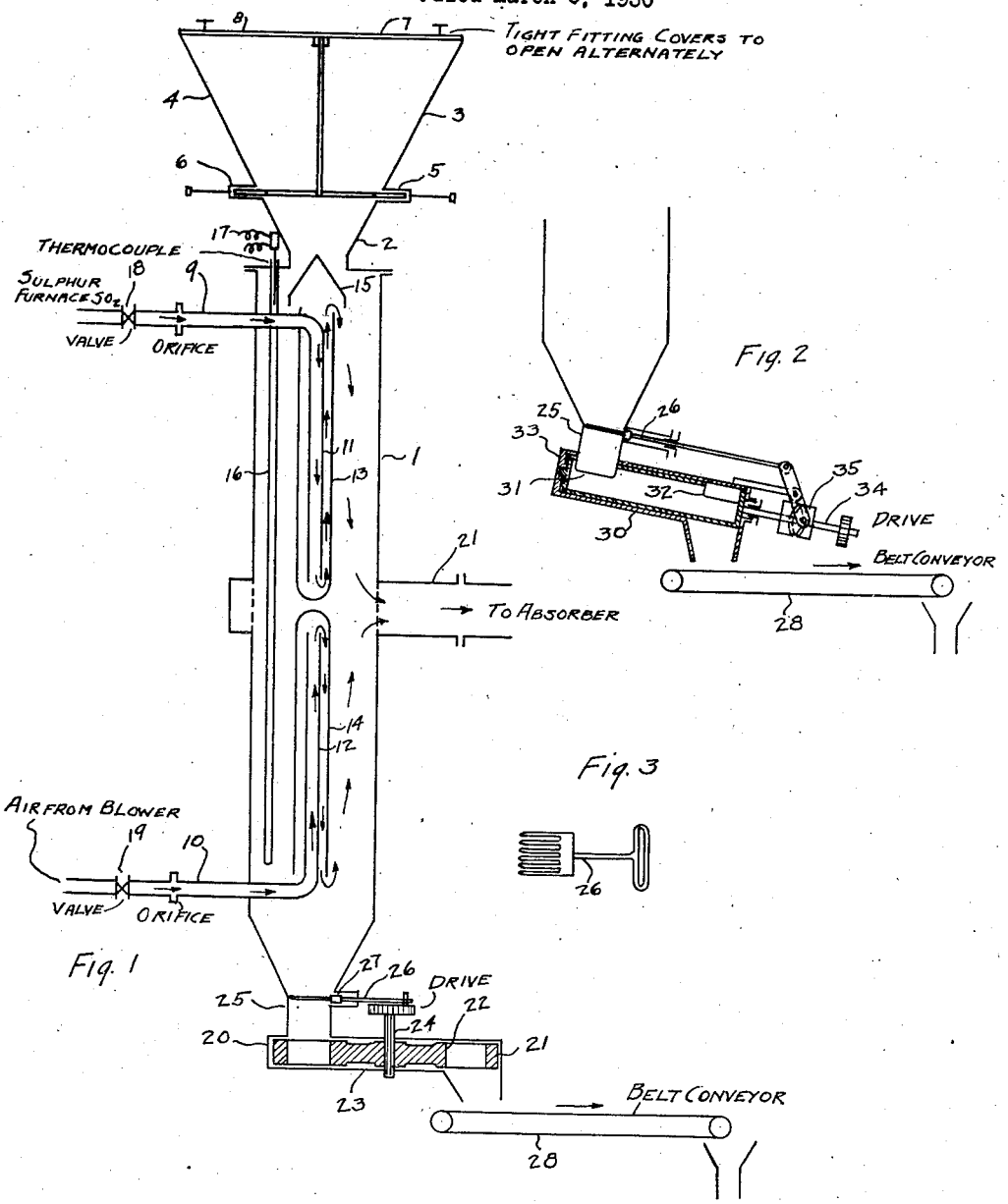

1,941,557

UNITED STATES PATENT OFFICE 1,941,557

METHOD FOR PREPARING CATALYSTS

Johannes L. Koetz, Pittsburgh, Pa., assignor to The Selden Company, Pittsburgh, Pa., a corporation of Delaware Application March 5, 1930. Serial No. 433,477

15 Claims. (Cl. 23—233)

This invention relates to a method and apparatus for preparing catalytic material, and more particularly for the pretreatment and calcination that is necessary for many catalysts before they are in condition for commercial use and for the regeneration of such catalysts after use. Objects of the invention are to provide an apparatus and a method of treatment that will result in an even and uniform heating of the raw or spent catalytic material and an even heat distribution therein together with a regular and even cooling of the material after the heat treatment has been completed.

The invention is applicable in general to all types of catalytic material, but its greatest utility will probably be found in the treatment of oxidation catalysts which are usually prepared in the form of pellets which must be submitted to a preliminary treatment with hot gases, and particularly to complex catalysts which contain water of hydration such as permutogenetic catalysts and the like. These substances are originally prepared in the form of wet hydrated gels, which upon drying at temperatures preferably below 100° C. are transformed into porous honeycomb like solids containing water of hydration. They may be properly described as raw catalysts. In this stage they exert catalytic properties, but it is necessary to neutralize alkalinity and to remove the water of hydration in order to attain full activity and uniform conversion, and this is usually done by subjecting the catalytic material to a calcination with acid gases, a mixture of sulfur dioxide and air followed by a cooling treatment with air alone being preferably used. Such catalysts are described, for example, in Patent Nos. 1,657,754 to Alphons O. Jaeger et al. and 1,675,308, 1,675,309, 1,694,123 and 1,709,853 to Alphons O. Jaeger. The first four of these patents describe catalysts for the contact sulfuric acid process, and the last patent describes catalysts for the catalytic oxidation of organic material.

In accordance with the present invention, the previously dried but not entirely dehydrated catalytic material is dehydrated in a continuous stream by subjecting earlier portions of the stream to the action of acid gases and air preheated to reaction temperatures or higher at the start of the process and the latter portions of the stream to a blast of cooling gas. When the chemical reaction has once set in the initial preheating may be reduced or dispensed with, depending on the amount of heat given off by the reaction.

The invention will be more particularly described in connection with the accompanying drawing which shows certain examples of means for effecting the process and the treatment of the catalyst with sulfur dioxide and air, as this is a preferred modification, but it is to be understood that the said drawing is illustrative only and the invention is not limited thereto.

Fig. 1 is a vertical section of a complete continuous calciner with a continuous discharging mechanism.

Fig. 2 shows a modified discharge mechanism therefor.

Fig. 3 is a detail of one of the discharging elements.

Referring to Fig. 1, the calciner consists of an outer shell 1, to which is affixed charging means 2, consisting of duplicate hoppers 3 and 4 with separate feeding mechanisms 5 and 6 respectively and separately removable covers 7 and 8. One or more pipes 9 and 10 are provided for the admission of reaction gases and fresh air, these pipes entering the shell 1 near its upper and lower ends respectively, and their vertical portions 11 and 12 extend into the bottoms of closed-end tubes 13 and 14 that are fitted around them, the whole making up a double unit for the simultaneous introduction of reacting gases, for example sulfur dioxide and air in the upper tubes and cooling gas, for example fresh air, in the lower tube. Only one of these double units is shown in the illustrative figure, but it is to be understood that this figure is by way of illustration only and that in larger installations of the apparatus a plurality of these units will be used. In such installations the baffle 15, which is shown as being placed over the upper tube to prevent its filling with catalyst will be duplicated for each additional unit. A well 16 is provided, in which suitable thermocouples 17 or other temperature indicating devices may be placed which may be so connected with the valve 18 and 19 in the pipes 9 and 10 as to provide automatic control for the apparatus.

In operation a continuous stream of the catalytic material to be dehydrated which may be, for example, a diluted non-siliceous base exchange body containing vanadium is maintained by the alternate action of the charging means 5 and 6, the hoppers 7 and 8 being filled alternately in such a manner that continuous action is maintained. The catalytic material passes downwardly over the baffle 15 and around the closed end tubes 13 and 14 and is discharged by a continuous discharging mechanism 20, the operation of which is presently to be described. Hot gases containing sulfur dioxide and air, preheated to reaction temperatures, are admitted through the pipe 9 and pass downwardly through the pipe 11, reverse their flow and pass upwardly through the pipe 13, and again reverse their flow under the influence of the baffle 15 and pass downwardly through the descending catalytic material and exit through the pipe 21. Simultaneously with this treatment air is admitted from a blower (not shown) through the pipe 10 and passes in the same manner as the sulfur dioxide gases through the concentric pipes 12 and 14, first in indirect and then in direct heat exchange relation with the calcined catalytic material and finally passes upwardly through the material counter to its downward flow and exits through the pipe 21.

From this construction it will be seen that by applying the principles of the present invention a very effective and complete calcination and cooling of the catalytic material can be effected in a continuous stream without danger of sintering the material or damaging the apparatus by overheating. The calcination of such material is in effect an oxidation of the sulfur dioxide gases to sulfur trioxide, using a continuous stream of fresh catalyst and discharging that which has been treated, and the problem of controlling the rate of heat evolution of the reaction is present just as in the commercial production of sulfuric acid. This problem is further complicated, however, by the fact that the heat producing conditions of the material in the upper and lower portions of the upper section of the apparatus where the reaction is taking place are not the same, for the fresh catalyst containing water of hydration has not only a much smaller activity for the sulfuric acid reaction than the completely calcined catalyst in the lower portions, but also a large proportion of the heat produced in the upper zones must be used to vaporize the water to be removed. By the use of one or more double countercurrent heat exchange elements the strongest cooling action of the incoming reaction gas mixture is exerted in the last zone where the reaction is taking place, this being the zone of greatest heat evolution both because the catalytic material is here at its greatest activity and because it contains no water of hydration to be vaporized. The production of heat within the catalyst mass diminishes gradually from this zone towards the top of the apparatus and the passage of the incoming reaction gas mixture in direct heat exchange relation with the catalyst in the same direction effects a very efficient transfer of the heat from the hot zone to the upper zones where it is needed. In the same manner the cooling air admitted through the pipe 10 exerts a strong cooling action on the catalyst at the hot central zone and then by passage downwardly through the open end tube 14 is gradually heated so that it is in excellent condition to sweep all the last remaining traces of water, sulfur trioxide, and any unreacted sulfur dioxide from the calcined catalyst.

In cases where the principles of the invention are to be applied to the regeneration of spent catalytic material, for example in processes such as those described in the Jaeger Patents 1,678,626 and 1,678,627, there may or may not be an exothermic reaction within the catalytic material itself depending on the nature of the impurities absorbed by the catalyst and of the treating gases. In all such cases where insufficient heat is generated it may be supplied by suitably preheating the acid or halogen gases which are admitted through the pipe 9, the heat being evenly distributed by the heat exchangers, and pass through the moving stream of catalyst as does the sulfur dioxide and air in the method that has been described. The flow of cooling air under such conditions usually remains the same.

The discharge mechanism may be of any suitable type, but it is preferable to use one which will effect a continuous and uniform discharge at a predetermined rate and one which will not permit the escape of objectionable fumes from the apparatus. A representative mechanism has been shown in connection with Fig. 1 which consists of a revolving member 21 provided with cylindrical orifices 22 of predetermined capacity, the whole rotating on a shaft 24 and surrounded by a suitable casing 23. The lower end of the shell 1 is constricted to form an outlet passage 25 across which extends a gate 26 which is designed to operate slidably in bearings 27 and to be actuated by a crank pin or other similar means mounted on the shaft 24, or connected thereto by suitable gearing if desired. In operation the opening of the gate 26 allows a predetermined amount of the calcined material to be discharged into the cylindrical openings of the rotary member 21, from which it falls by gravity onto the conveyor belt 28 and is conducted to storage or elsewhere.

A discharge mechanism design to give a more accurate and uniform measurement of the discharged catalytic material is shown in Fig. 2 and consists of an inclined rotary drum 30 provided with openings 31 and 32 mounted in a surrounding sleeve 33 and driven by a suitable shaft and gearing 34. The discharge gate 26 is driven by a suitable cam and rocker arm 35 mounted on the shaft 34 and operates in synchronism therewith to permit the discharge of measured amounts of the catalytic material into the drum 30 when the opening 31 comes into registry with the lower portion 25 of the calciner shell. Upon rotation of the shaft 34 through 180° the catalytic material is discharged onto the conveyor belt 28 through the opening 32, at which time the gate 26 is closed and the intake 31 of the cylinder is out of registry with the discharge 25. A measured amount of the catalytic material is thus allowed to pass the gate 26, the amount depending on the length of the constricted passage 25, and upon further rotation of the shaft the gate closes and the charge is delivered into the drum.

The invention has been described in connection with the treatment of a stabilized catalyst with acid gases which react during the treatment, as this is the preferred modification. It is to be understood, however, that the invention is not limited to the use of acid gases or to gases which are reactive or to any particular class of catalysts, and many important advantages are obtained even when non-reactive gases are used.

In the specification the term "acid gases" is used to include both gases which are themselves acid, such as HCl gases, and gases which react acid when brought into contact with water, such as $SO_2$.

What is claimed as new is:
1. A method of treating raw catalytic material containing water of hydration, which comprises subjecting it to the heat given off by a chemical reaction that is set up within a moving stream of said material.

2. A process of treating raw catalytic material which comprises maintaining a flow of said material and passing longitudinally of said flow a gaseous mixture heated to reaction temperatures and capable of setting up an exothermic reaction in the presence of said catalytic material and thereby driving off moisture.

3. A process of treating raw catalytic material, which comprises maintaining a flow of said material and passing through said material in the direction of its flow a gaseous mixture heated to reaction temperatures and capable of setting up an exothermic reaction in the presence of said catalytic material and thereby driving off moisture.

4. A process of treating raw catalytic material, which comprises maintaining a flow of said material and passing through said material in the direction of its flow a gaseous mixture heated to reaction temperatures and capable of setting up an exothermic reaction in the presence of said catalytic material and thereby driving off moisture and subjecting further portions of the flow of material to heat exchange with a stream of cooling gas.

5. A process of treating raw catalytic material which comprises maintaining a flow of said raw material containing water of hydration in contact with at least one heat exchanger and passing a heating fluid through said heat exchanger and then through said catalytic material.

6. A process of treating raw catalytic material, which comprises maintaining a flow of said material through a reaction chamber, introducing a mixture containing acid gases and air heated to reaction temperatures and capable of instituting an exothermic reaction in the presence of said material and thereby effecting dehydration and neutralization into the upper portion of said chamber, passing the reaction mixture in the direction of flow of said material for at least a portion of the length of said chamber, and subjecting the material in the lower portions of said chamber to heat exchange with a stream of cooling gas.

7. A method of calcining raw catalytic material, which comprises subjecting it to the heat given off by a chemical reaction that is set up within a moving stream of said material and controlling the temperature of calcination by heat exchange with the incoming reaction gas mixture.

8. A method according to claim 7, in which the temperature control is effected by passing the incoming reaction mixture first in indirect and then in direct heat exchanging relation with the descending catalytic material, the gas in direct heat exchanging relation being passed countercurrent to the flow of the catalytic material.

9. A process of calcining catalytic material, which comprises maintaining a continuous flow of said material, passing a mixture of gases through at least a portion of the flow of said catalytic material, said gases being capable of setting up an exothermic reaction in the presence of said catalytic material, and subjecting later portions of the flow of said material to the action of a cooling gas that is caused to pass in indirect heat exchanging relation with the material, to reverse its flow and pass in direct heat exchanging relation with the material and with the incoming gases, and to again reverse its flow and pass through the material in countercurrent to the flow thereof.

10. A method according to claim 1 in which the catalytic material is a pellet catalyst.

11. A method according to claim 7 in which the catalytic material is an uncalcined pellet catalyst.

12. A method according to claim 1, in which the catalyst is a pellet contact sulfuric acid catalyst.

13. A method according to claim 7, in which the catalyst is an uncalcined pellet contact sulfuric acid catalyst.

14. A method according to claim 1, in which the catalyst is a vanadium containing pellet catalyst for the contact sulfuric acid process.

15. A method according to claim 7, in which the catalyst is a vanadium containing uncalcined pellet catalyst for the contact sulfuric acid process.

JOHANNES L. KOETZ.